US012598384B2

(12) United States Patent
Nishide

(10) Patent No.: US 12,598,384 B2
(45) Date of Patent: Apr. 7, 2026

(54) IMAGING DEVICE WITH FILTER SWITCHING, METHOD FOR CONTROLLING THE SAME, AND STORAGE MEDIUM

(71) Applicant: CANON KABUSHIKI KAISHA, Tokyo (JP)

(72) Inventor: Akihiko Nishide, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 60 days.

(21) Appl. No.: 18/629,231

(22) Filed: Apr. 8, 2024

(65) Prior Publication Data

US 2024/0348920 A1      Oct. 17, 2024

(30) Foreign Application Priority Data

Apr. 13, 2023      (JP) ................................. 2023-065923

(51) Int. Cl.
*H04N 23/68* (2023.01)
*H04N 23/51* (2023.01)
*H04N 23/55* (2023.01)

(52) U.S. Cl.
CPC ............. *H04N 23/68* (2023.01); *H04N 23/51* (2023.01); *H04N 23/55* (2023.01)

(58) Field of Classification Search
CPC ........ H04N 23/68; H04N 23/51; H04N 23/55; H04N 23/54; H04N 23/667; H04N 23/75
USPC ................................................... 348/207.99
See application file for complete search history.

(56) References Cited

U.S. PATENT DOCUMENTS

| | | | | |
|---|---|---|---|---|
| 4,396,288 A * | 8/1983 | Helphrey | .................. | G01J 3/12 356/418 |
| 5,046,162 A * | 9/1991 | Ishikawa | .................. | G02B 5/20 348/270 |
| 7,738,199 B1 * | 6/2010 | Wen | ........................ | G03B 11/00 359/722 |
| 8,223,206 B2 * | 7/2012 | Cromwell | .............. | H04N 23/20 348/33 |
| 8,331,047 B2 * | 12/2012 | Hung | ..................... | G02B 7/006 359/889 |
| 9,121,760 B2 * | 9/2015 | Cabib | .................... | H04N 23/81 |
| 10,955,639 B2 * | 3/2021 | Lee | ........................ | G03B 17/12 |

(Continued)

FOREIGN PATENT DOCUMENTS

JP      3979394 B2      9/2007

*Primary Examiner* — Usman A Khan
(74) *Attorney, Agent, or Firm* — Canon U.S.A., Inc. IP Division

(57) ABSTRACT

An imaging device includes a holding unit that is arranged between an imaging lens and an imaging element includes an opening on which an optical element is mounted, and holds the optical element, a moving unit that moves the holding unit, a regulating unit that regulates movement of the holding unit, a detection unit that detects a position of the holding unit, a determination unit configured to determine whether the opening of the holding unit is within a predetermined range based on a detection result of the detection unit, and a control unit configured to control the moving unit based on a determination result of the determination unit. In a case where the opening of the holding unit is within the predetermined range, the opening does not block a light beam incident on an effective pixel of the imaging element.

13 Claims, 14 Drawing Sheets

(56)     References Cited

U.S. PATENT DOCUMENTS

| | | | | |
|---|---|---|---|---|
| 2003/0005785 | A1 * | 1/2003 | Ung | F16H 25/2418 |
| | | | | 74/89.33 |
| 2005/0141117 | A1 * | 6/2005 | Kim | H04N 23/55 |
| | | | | 359/892 |
| 2007/0229979 | A1 * | 10/2007 | Nurishi | G02B 7/36 |
| | | | | 359/697 |
| 2007/0291157 | A1 * | 12/2007 | Ding | H04N 23/55 |
| | | | | 348/E5.09 |
| 2010/0172036 | A1 * | 7/2010 | Qian | G02B 26/007 |
| | | | | 359/814 |
| 2011/0058804 | A1 * | 3/2011 | Ito | H04N 23/667 |
| | | | | 348/342 |
| 2012/0086849 | A1 * | 4/2012 | Wada | G02B 27/46 |
| | | | | 348/344 |
| 2012/0147185 | A1 * | 6/2012 | Qian | G02B 26/007 |
| | | | | 348/E7.087 |
| 2012/0320202 | A1 * | 12/2012 | Qian | G02B 26/023 |
| | | | | 359/889 |
| 2013/0148222 | A1 * | 6/2013 | Wang | G02B 7/006 |
| | | | | 359/892 |
| 2022/0166906 | A1 * | 5/2022 | Galindo | H04N 23/55 |
| 2024/0073504 | A1 * | 2/2024 | Li | H04N 23/57 |

* cited by examiner

FIG.4A
FIG.4B
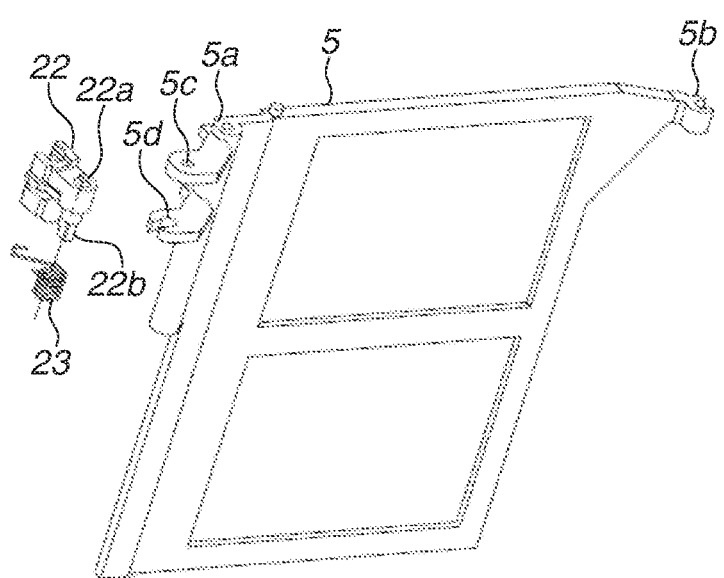
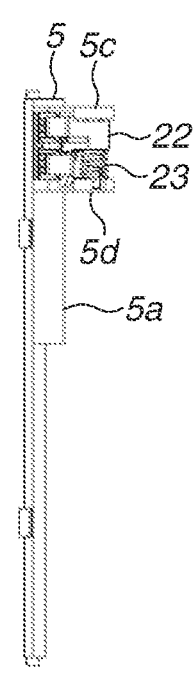
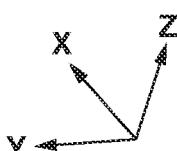

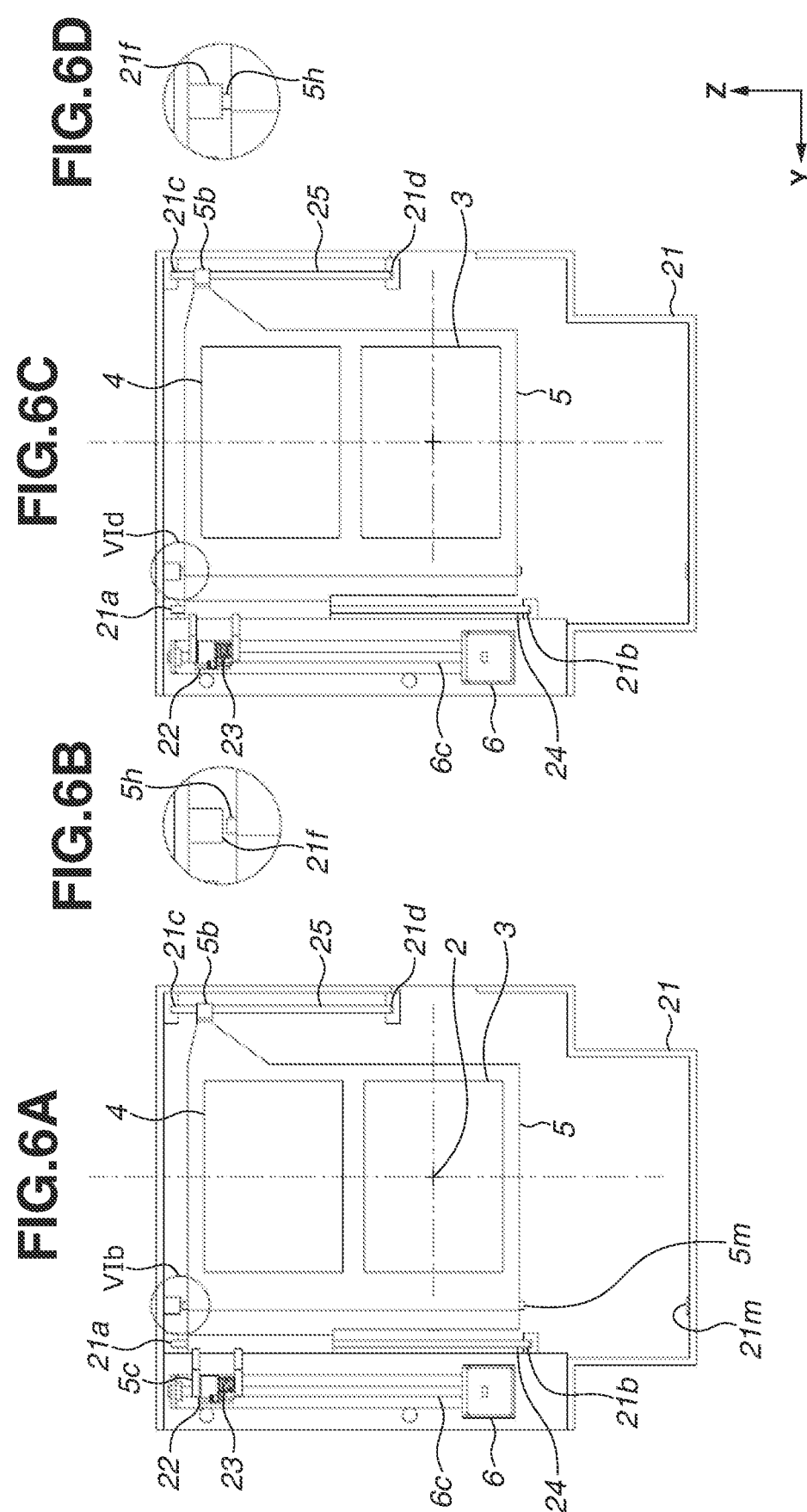

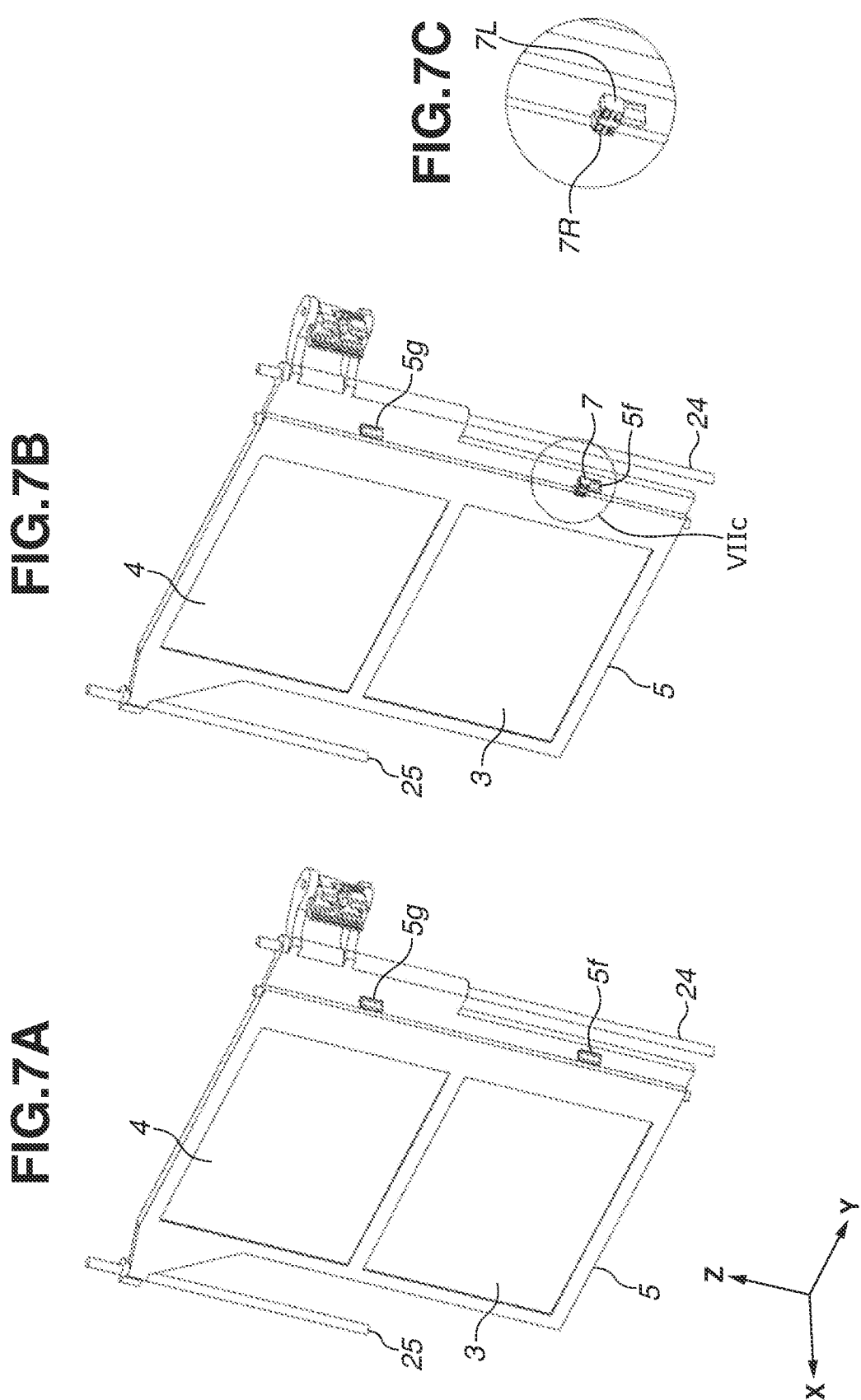

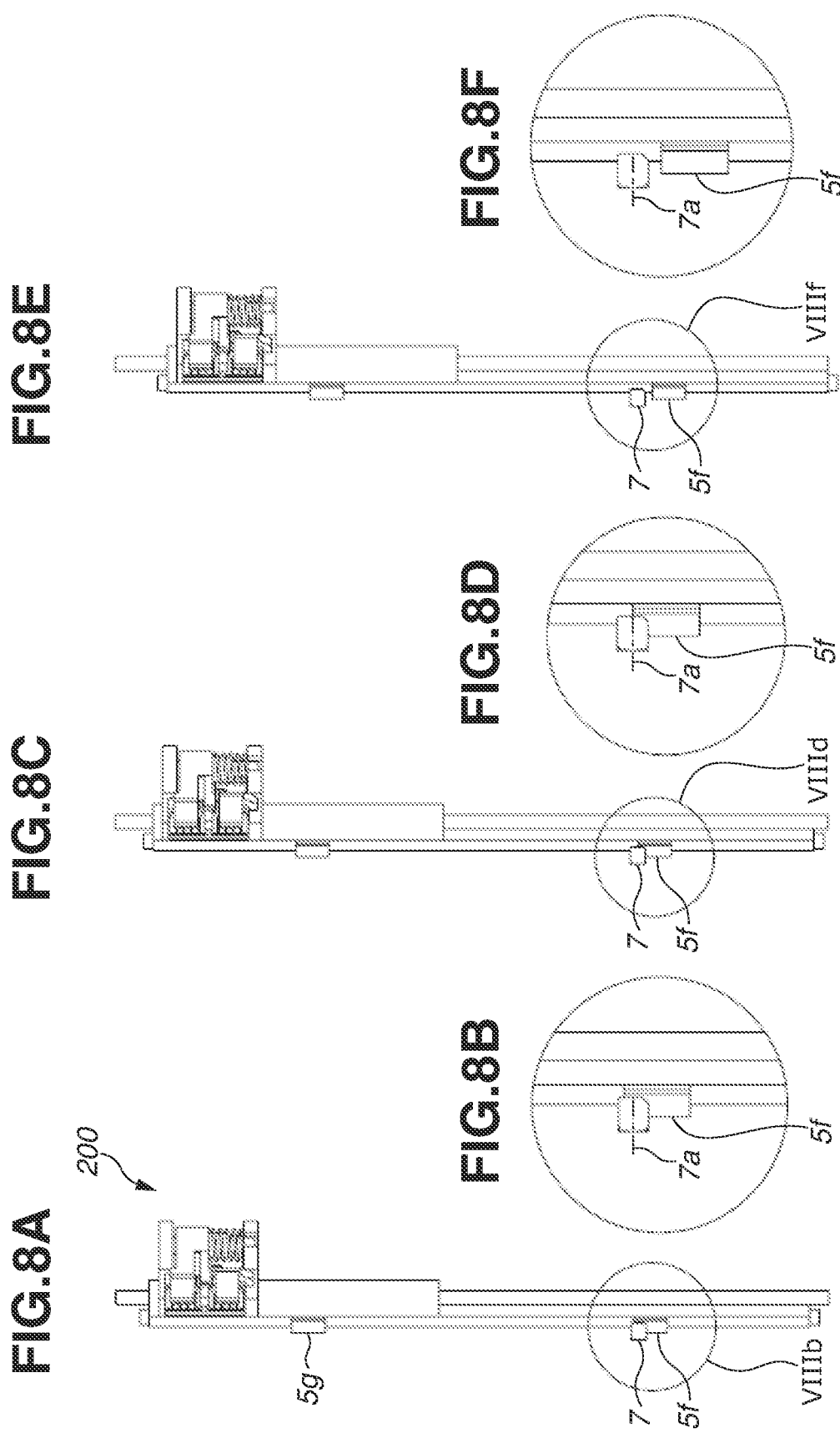

90

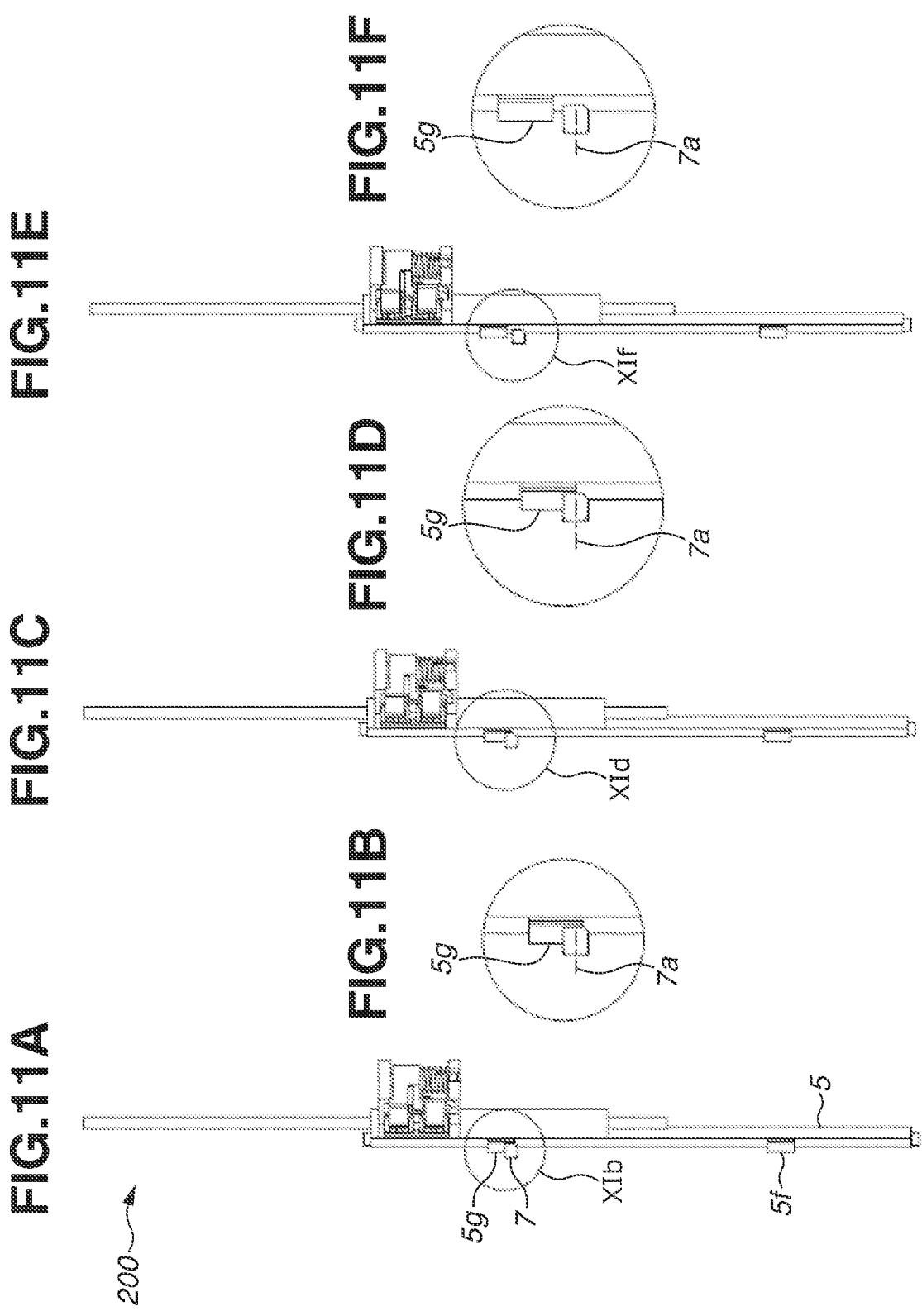

120

IMAGING DEVICE WITH FILTER SWITCHING, METHOD FOR CONTROLLING THE SAME, AND STORAGE MEDIUM

BACKGROUND

Field

The present disclosure relates to an imaging device, a method for controlling the same, and a storage medium.

Description of the Related Art

Conventionally, camera devices having a mechanism for inserting and removing an optical filter into and from an optical path have been known. For example, according to Japanese Patent No. 03979394, an imaging device is discussed that can switch imaging modes by inserting and removing an optical filter (infrared cut filter) into and from an optical path.

The imaging device according to Japanese Patent No. 03979394 has a setting position where the optical filter is inserted into the optical path and a setting position where the optical filter is removed from the optical path. In addition, the imaging device includes a drive unit (moving unit) that moves the optical filter to the two setting positions, a stopper that regulates the two setting positions, an impact detection unit that detects an impact force applied to the imaging device, and a control unit that controls the drive unit based on impact information.

In the imaging device according to Japanese Patent No. 03979394, the optical filter is moved in a direction to maintain a setting state based on an impact detected by the impact detection unit. With this operation, even if the optical filter is moved accidentally due to an impact or the like, it is possible to return the optical filter to the setting position. The technique according to Japanese Patent No. 03979394 returns the position of the optical filter to the setting position based on the detected impact. In other words, the technique does not detect movement of the optical filter itself. Thus, it is not possible to reliably detect how much the optical filter has moved due to the impact. Accordingly, it may not be possible to maintain the setting state as intended, and it may not be possible to perform appropriate imaging. Further, the technique according to Japanese Patent No. 03979394 requires the impact detection unit.

SUMMARY

The present disclosure is directed to the provision of an imaging device that has a simple configuration and can perform appropriate imaging. In order to achieve the provision described above, an imaging device according to some embodiments can include an imaging lens, an imaging element, an optical element, a holding unit that is arranged between the imaging lens and the imaging element in an optical axis direction of the imaging lens and configured to include an opening on which the optical element is mounted and to hold the optical element, a moving unit that moves the holding unit in a direction perpendicular to an optical axis of the imaging lens, a regulating unit that regulates movement of the holding unit in the direction perpendicular to the optical axis, a detection unit that detects a position of the holding unit, a hardware processor, and a memory for storing instructions to be executed by the hardware processor, wherein, when the instructions stored in the memory are executed by the hardware processor, the imaging device functions as a determination unit configured to determine whether the opening of the holding unit is within a predetermined range based on a detection result of the detection unit, and a control unit configured to control the moving unit based on a determination result of the determination unit. The predetermined range is defined by a position where movement of the holding unit is regulated by the regulating unit and a position where the detection result of the detection unit is switched, and, in a case where the opening of the holding unit is within the predetermined range, the opening does not block a light beam incident on an effective pixel of the imaging element.

Further features of the present disclosure will become apparent from the following description of exemplary embodiments with reference to the attached drawings.

BRIEF DESCRIPTION OF THE DRAWINGS

FIGS. 4A and 4B illustrate installation of a rack of the filter switching structure in FIG. 2.

FIGS. 6A to 6D illustrate the filter switching structure in a day mode.

FIGS. 7A to 7C are perspective views illustrating a relationship between a filter holder and a photointerrupter.

FIGS. 8A to 8F illustrate the filter switching structure in the day mode.

FIGS. 11A to 11F illustrate the filter switching structure in the night mode.

DESCRIPTION OF THE EMBODIMENTS

Figure 1:
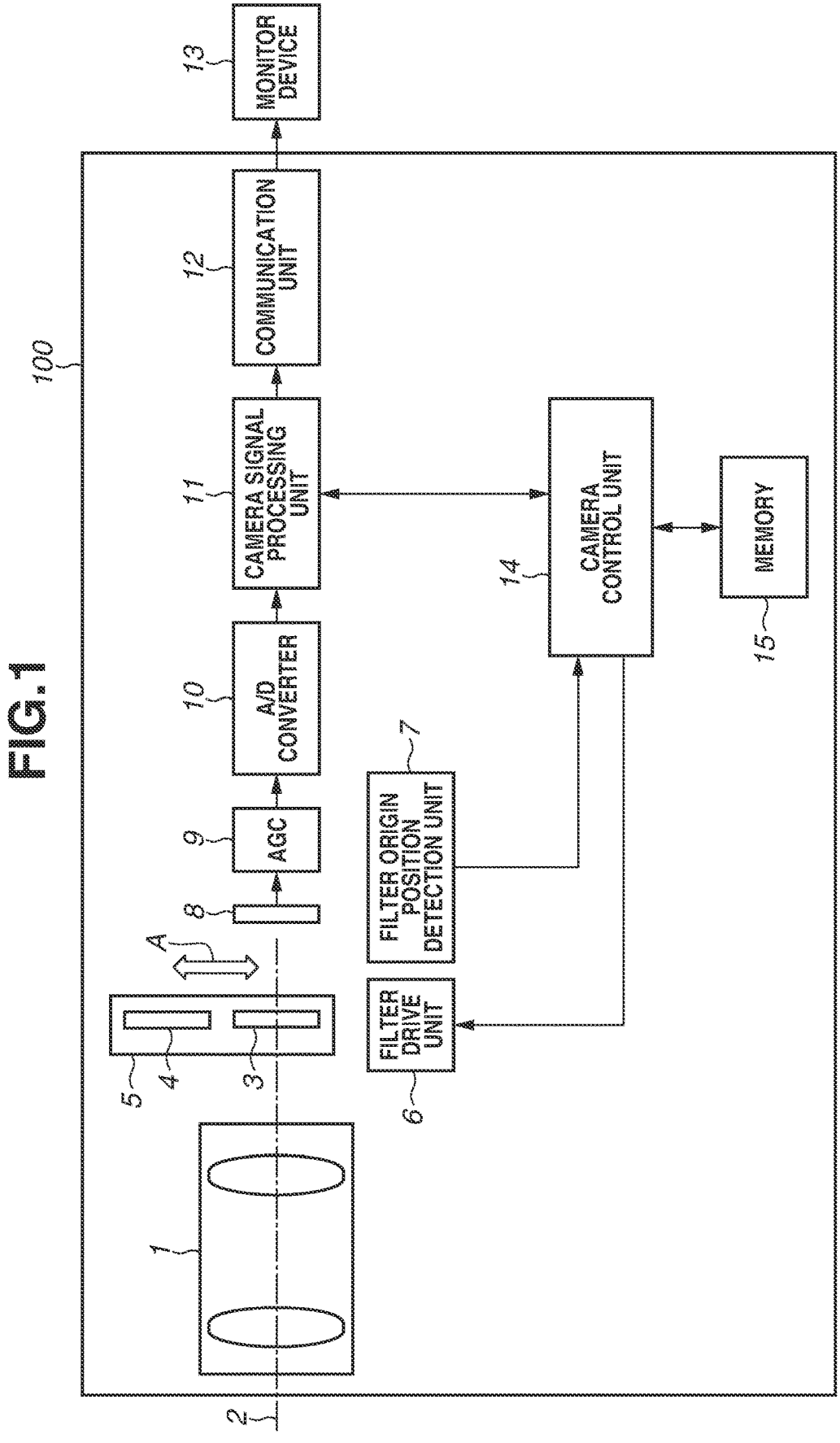
FIG. 1 is a block diagram illustrating an imaging device according to an exemplary embodiment of the present disclosure.

Various exemplary embodiments, features, and aspects of the present disclosure will be described in detail below with reference to the attached drawings. It is noted that the following exemplary embodiments are not meant to limit the scope of the present disclosure as encompassed by the appended claims. Although a plurality of features is described in the exemplary embodiments, not all of the plurality of features are essential to the present disclosure, and the plurality of features may be arbitrarily combined. The same or similar components in the attached drawings are denoted by the same reference numerals, and redundant description will be omitted.

FIG. 1 is a block diagram illustrating an imaging device 100 according to a first exemplary embodiment of the present disclosure.

The imaging device 100 according to the present exemplary embodiment includes an imaging lens 1, a filter holder 5, an infrared cut filter 3 and a dummy glass 4, which are mounted on the filter holder 5, an imaging element 8, an automatic gain controller (AGC) 9, an analog/digital (A/D) converter 10, a camera signal processing unit 11, and a communication unit 12. The imaging device 100 also includes a filter drive unit 6, a filter origin position detection unit 7, a camera control unit 14, and a memory 15. The imaging device 100 is connected to a monitor device 13 wirelessly or by wire. The imaging device 100 according to the present exemplary embodiment includes a filter switching structure 200 (FIGS. 2, 3A and 3B) as described below. The imaging device 100 can include a hardware processor, circuitry, or combinations thereof, and a memory for storing instructions to be executed by the hardware processor, wherein, when the instructions stored in the memory are executed by the hardware processor, the imaging device can function as the elements or components of the imaging device 100.

The imaging lens 1 forms an optical image of an object (a subject). The imaging lens 1 has an optical axis 2.

Figure 2:
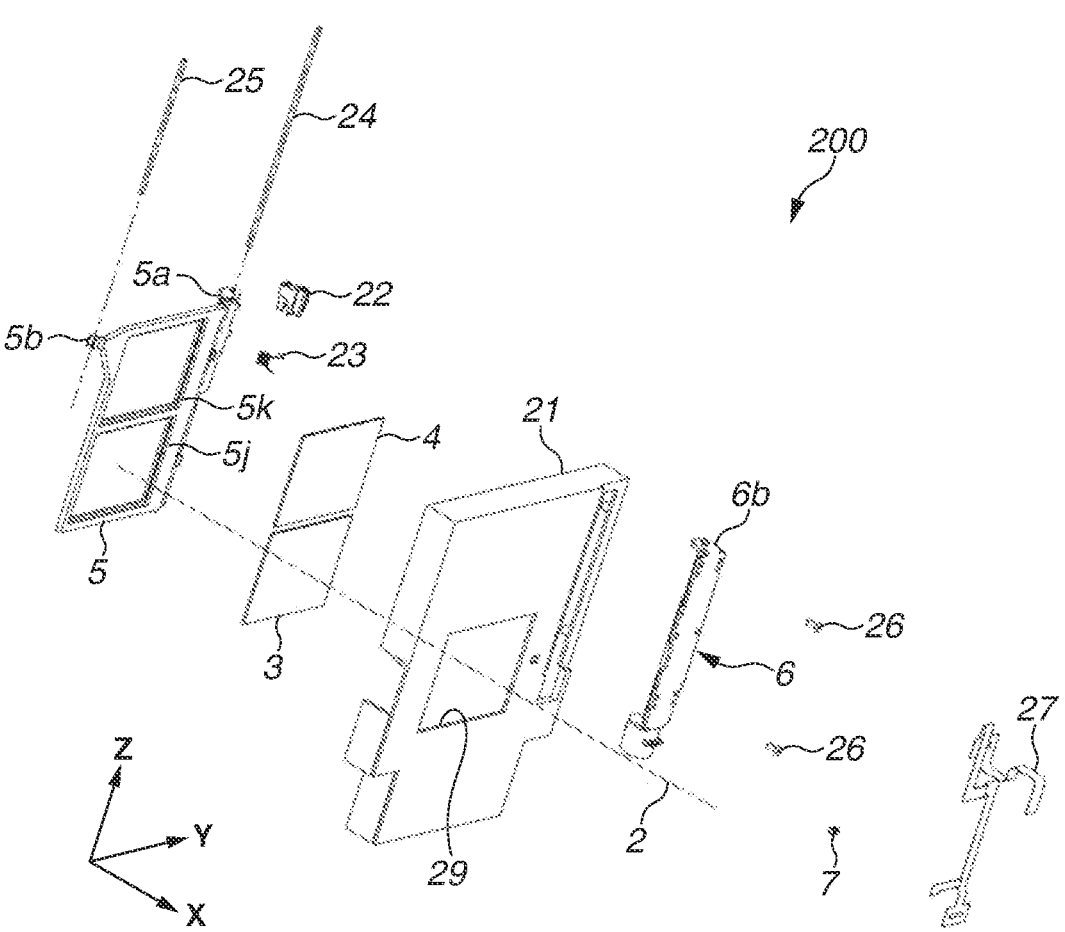
FIG. 2 is an exploded perspective view of a filter switching structure of the imaging device in FIG. 1.

The filter holder 5 has two openings (a first opening 5j and a second opening 5k) (FIG. 2). The infrared cut filter 3 is mounted on the first opening 5j (FIG. 2) of the filter holder 5. The dummy glass 4 is mounted on the second opening 5k (FIG. 2) of the filter holder 5.

The infrared cut filter 3 is an optical element that has a property of blocking infrared light and blocks infrared light from an optical image formed by the imaging lens 1 and prevents infrared light from being incident on the imaging element 8. Many common imaging elements are sensitive not only to visible light but also to infrared light, and a role of the infrared cut filter 3 is to prevent an imaging screen from becoming reddish due to an influence of infrared light if the infrared is incident on the imaging device 100 (the imaging element 8). In a case where color reproducibility of a subject is prioritized, imaging is performed by inserting the infrared cut filter 3 into an optical path to prevent infrared light from being incident on the imaging element 8. This imaging is referred to as imaging in a day mode.

The dummy glass 4 is an optical element that has a property of transmitting infrared light in addition to visible light. In a case where imaging is performed with an emphasis on low illumination performance, the dummy glass 4 is arranged on the optical axis 2. In a dark environment, imaging is performed in a low illumination environment, so that the infrared cut filter 3 is removed from the optical path, and imaging is performed in a state in which not only visible light but also infrared light are taken in the imaging element 8 in order to improve recognition performance for a subject. This imaging is referred to as imaging in a night mode. In a case where the imaging is performed in the night mode, a captured image may be displayed as a monochrome image to reduce a feeling of strangeness in color.

In a configuration in FIG. 1, the filter holder 5 and optical filters (the optical elements including the infrared cut filter 3 and the dummy glass 4) are arranged between the imaging lens 1 and the imaging element 8, in an optical axis direction of the imaging lens 1. The filter holder 5 is a holding unit and can include an opening on which the optical elements 3 and 4 are mounted and to hold the optical elements 3 and 4. With this arrangement, the imaging lens 1 can be replaced. Further, an optical path diameter is small at a position between the imaging lens 1 and the imaging element 8, so that the optical filters 3 and 4 can be made relatively small with the above-described arrangement.

The filter drive unit 6 can be, for example, a stepping motor or another motor. As indicated by an arrow A, the filter drive unit 6 can drive (move) the filter holder 5 in a direction perpendicular to the optical axis 2 of the imaging lens 1 and switch the optical element placed on the optical axis 2 (can place the infrared cut filter 3 or the dummy glass 4 on the optical axis 2). In a case where a term "perpendicular" is used in the specification, it is not limited to "perpendicular" in a strict mathematical sense, but "perpendicular" also includes angles that are substantially perpendicular (90 degrees+several degrees). The filter drive unit 6 moves the filter holder 5, so that it may also be referred to as a filter holder moving unit.

As described above, the imaging device 100 according to the present exemplary embodiment can switch between the day mode with an emphasis on color reproducibility in which the infrared cut filter 3 is arranged on the optical axis 2 and the night mode with an emphasis on low illumination performance in which the dummy glass 4 is arranged on the optical axis 2. If the imaging device 100 can switch between the day mode imaging and the night mode imaging, it is possible to perform imaging in accordance with an imaging environment and an application.

The filter origin position detection unit 7 is a photointerrupter (PI) and detects a position (an origin position) of the filter holder 5. The origin position of the filter holder 5 is described below with reference to FIGS. 8A to 8F and FIGS. 11A to 11F. In the following descriptions, the filter origin position detection unit 7 is referred to as the photointerrupter 7.

The imaging element 8 is configured with, for example, a complementary metal oxide semiconductor (CMOS) sensor.

An optical image formed by the imaging lens 1 is converted into an electrical signal by the imaging element 8. The electrical signal (video signal) output from the imaging element 8 is subjected to gain adjustment by the AGC 9, subjected to A/D conversion by the A/D converter 10, and then is input to the camera signal processing unit 11. The camera signal processing unit 11 can include one or more processors, circuitry, or combinations thereof, and performs image processing on the electrical signal to generate a video signal. The video signal is output from the camera signal processing unit 11 to the communication unit 12 and the camera control unit 14. The communication unit 12 transmits the video signal to the monitor device 13. The monitor device 13 outputs (displays) the received video signal as a captured image.

The camera control unit 14 can include one or more processors, circuitry, or combinations thereof, and controls signal processing by the camera signal processing unit 11. The camera control unit 14 further controls driving of the filter drive unit 6 based on detection information by the photointerrupter 7 to switch the optical elements (the infrared cut filter 3 and the dummy glass 4). The camera control unit 14 is connected to the memory 15.

The memory 15 can include, for example, a read only memory (ROM), a random access memory (RAM), and can include other memories. The memory 15 stores a program used by the camera control unit 14. The memory 15 may also store the video signal generated by the camera signal processing unit 11. Further, the memory 15 stores various numerical values and various kinds of data used by the imaging device 100. For example, the memory 15 stores numerical values and data related to driving of the filter drive unit (stepping motor) 6.

Figures 3A, 3B:
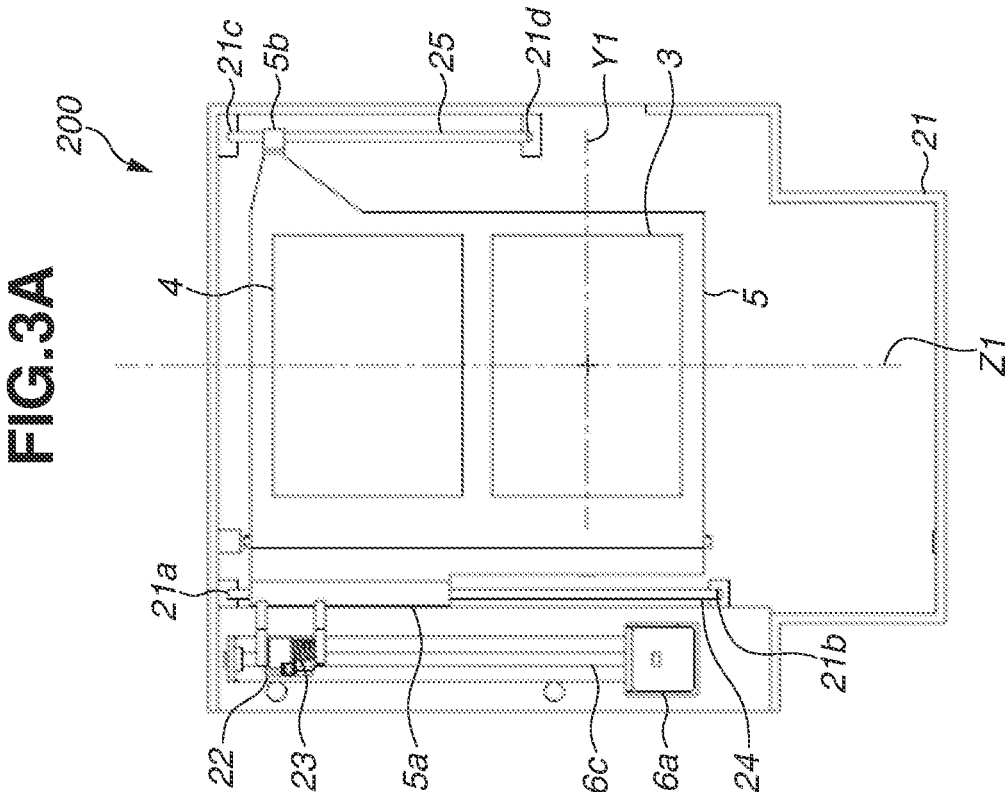
FIGS. 3A and 3B illustrate the filter switching structure in FIG. 2.

FIGS. 2, 3A, and 3B illustrate the filter switching structure 200 of the imaging device 100. FIG. 2 is an exploded perspective view of the filter switching structure 200. In FIG. 2, a direction of the optical axis 2, a width direction, and a height direction of the imaging device 100 are respectively referred to as an X direction, a Y direction, and a Z direction. The Z direction is sometimes referred to as a vertical direction. FIGS. 3A and 3B illustrate an assembled state of the filter switching structure 200. More specifically, FIG. 3A illustrates the filter switching structure 200 viewed from an imaging lens 1 side, and FIG. 3B illustrates the filter switching structure 200 viewed from an imaging element 8 side. The filter switching structure 200 includes the filter holder 5, a first guide bar 24, a second guide bar 25, a fixing frame 21, a rack 22, a rack spring 23, the filter drive unit (stepping motor) 6, the photointerrupter 7, and a flexible printed circuit (FPC) 27. The first guide bar 24 is longer than the second guide bar 25. The FPC 27 is mounted on the fixing frame 21. The rack 22 may also be referred to as a rack member.

The infrared cut filter 3 and the dummy glass 4 are respectively mounted on the first opening 5*j* and the second opening 5*k* of the filter holder 5 with an adhesive or the like. The first opening 5*j* and the second opening 5*k* have the same shape. The first opening 5*j* is formed below the second opening 5*k*. The infrared cut filter 3 and the dummy glass 4 have the same shape.

As illustrated in FIG. 2, the filter holder 5 has a substantially rectangular shape that is long in the Z direction if it is viewed in the X direction. The filter holder 5 has a sleeve hole portion 5*a* and a U-shaped groove portion 5*b* respectively at one end and the other end of the upper side. The sleeve hole portion 5*a* is a hollow cylindrical portion, and a hole (hollow portion) of the sleeve hole portion 5*a* extends in the Z direction. A groove of the U-shaped groove portion 5*b* also extends in the Z direction. The first guide bar 24 is inserted into the sleeve hole portion 5*a* with some backlash (allowance) in a radial direction of the first guide bar 24. The first guide bar 24 is fixed to the fixing frame 21, but the filter holder 5 can move along the first guide bar 24. The second guide bar 25 is inserted into the U-shaped groove portion 5*b* with backlash in a radial direction of the second guide bar 25. The second guide bar 25 is fixed to the fixing frame 21, but the filter holder 5 can move along the second guide bar 25. The filter holder 5 has a rectangular opening 29. The opening 29 is slightly larger than the infrared cut filter 3 (FIG. 3B).

As illustrated in FIG. 3A, the fixing frame 21 has a substantially rectangular shape that is long in the Z direction if it is viewed in the X direction. A first press-fit portion 21*a* is formed on a left side of the upper side of the fixing frame 21. A second press-fit portion 21*b* is formed below the first press-fit portion 21*a* of the fixing frame 21. Both end portions (an upper end portion and a lower end portion) of the first guide bar 24 are fixed by press-fitting in the radial direction into the first press-fit portion 21*a* and the second press-fit portion 21*b* of the fixing frame 21. The first guide bar 24 cannot move in the Z direction. The opening 29 of the fixing frame 21 has a center line Y1 in a horizontal direction and a center line Z1 in the perpendicular direction. The optical axis 2 passes through an intersection of the two center lines Y1 and Z1 in a direction perpendicular to a paper surface of FIGS. 3A and 3B.

A third press-fit portion 21*c* is formed on a right side of the upper side of the fixing frame 21. A fourth press-fit portion 21*d* is formed below the third press-fit portion 21*c* of the fixing frame 21. Both end portions (an upper end portion and a lower end portion) of the second guide bar 25 are fixed by press-fitting in the radial direction into the third press-fit portion 21*c* and the fourth press-fit portion 21*d* of the fixing frame 21. The second guide bar 25 cannot move in the Z direction.

The filter holder 5 is guided by the first guide bar 24 and the second guide bar 25 to be able to move in a direction substantially perpendicular to the optical axis 2 of the imaging lens 1 (the Z direction). The filter holder 5 can move with respect to the fixing frame 21.

The rack 22 and the rack spring 23 are mounted on an upper left part of the filter holder 5.

The filter drive unit (stepping motor) 6 includes an engine unit (actuator) 6*a*, a U-shaped sheet metal portion 6*b*, and a screw shaft portion 6*c*. The screw shaft portion 6*c* rotates around a central axis of a screw shaft by driving of the engine unit 6*a*. The screw shaft portion 6*c* extends in the Z direction. The engine unit 6*a* is located at a lower end portion of the screw shaft portion 6*c*. The screw shaft portion 6*c* may also be referred to as a lead screw.

The stepping motor 6 is fixed to the fixing frame 21 with screws 26, mounted on the FPC 27, and is driven by supplying of current to a terminal portion of the engine unit 6*a* through the FPC 27.

The FPC 27 mounts the photointerrupter (PI) 7 that is the filter origin position detection unit. The photointerrupter 7 has a U-shape, includes a light-emitting unit 7L (FIG. 7B) and a light-receiving unit 7R (FIG. 7B) on positions facing each other, and detects a light-blocking state if a light-blocking piece exists between the light-emitting unit 7L and the light-receiving unit 7R. The photointerrupter 7 has a property of changing its output value depending on whether light is blocked (detects that the light from the light-emitting unit 7L is blocked using the light-receiving unit 7R and changes the output). Taking advantage of this property, the photointerrupter 7 sets a position where detection of whether light is blocked is switched, as the origin position of the filter drive unit 6. The photointerrupter 7 is provided on the fixing frame 21, which is an immovable member with respect to the filter holder 5.

FIGS. 4A and 4B illustrate how the rack 22 is mounted on the fixing frame 21. FIG. 4A is an exploded perspective view of a mounting structure of the rack 22, and FIG. 4B illustrates an assembled state viewed from the Y direction.

As illustrated in FIGS. 4A and 4B, the rack 22 includes a conical shaft portion 22*a* extending in a +Z direction and a shaft portion 22*b* extending in a −Z direction. The filter holder 5 includes a hole portion 5*c* and a groove portion 5*d* near the sleeve hole portion 5*a*. The groove portion 5*d* is located below the hole portion 5*c*. The rack 22 is held between the hole portion 5*c* and the groove portion 5*d*.

The conical shaft portion 22*a* of the rack 22 is inserted into the hole portion 5*c* of the filter holder 5 in a state where the rack spring 23 is fitted into the shaft portion 22*b* of the rack 22, and the shaft portion 22*b* is inserted into the groove portion 5*d* of the filter holder 5, so that the rack 22 is mounted on the filter holder 5. In this state, the rack 22 is urged in an axial direction (the +Z direction) by the filter holder 5 due to a spring action in an axial direction of the rack spring 23, and accordingly the rack 22 is prevented from coming off from the filter holder 5.

Figure 5:
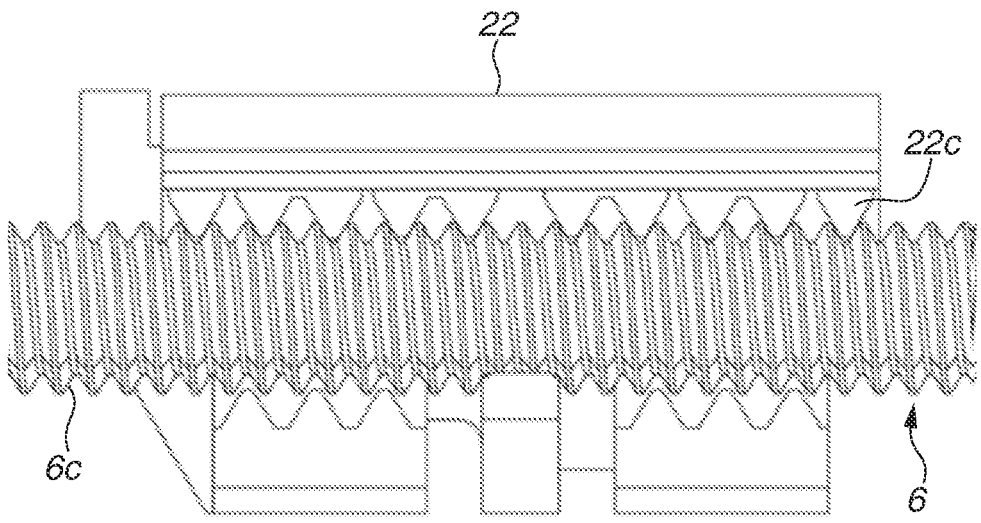
FIG. 5 illustrates engagement between the rack and a screw shaft portion in FIGS. 4A and 4B.

FIG. 5 illustrates engagement between the rack 22 and a screw portion of the screw shaft portion 6*c* of the stepping motor 6 and illustrates an engaged state.

As illustrated in FIG. 5, the rack 22 includes main teeth 22*c*. The main teeth 22*c* are screwed to the screw shaft portion 6*c*, so that if the screw shaft portion 6*c* rotates, the rack 22 moves in an axial direction of the screw shaft portion 6*c* (the Z direction). The rack 22 is fixed to the filter holder 5. Thus, the filter holder 5 is moved in the direction substantially perpendicular to the optical axis 2 (the Z direction) by rotation of the screw shaft portion 6*c*. The main teeth 22*c* may also be referred to as an engagement portion.

According to the present exemplary embodiment, the filter holder 5 holding the optical filters 3 and 4 is moved by the screw shaft portion 6*c* via the rack 22. Such a structure is suitable in a case where a movement amount of the filter holder 5 is large. This is because if a length of the screw shaft portion 6*c* corresponds to the movement amount of the filter holder 5, the filter holder 5 can be driven (moved) by a predetermined distance in the Z direction regardless of drive torque of a motor.

FIGS. 6A to 6D illustrate the filter switching structure 200 in the day mode viewed from the imaging lens 1 side. More specifically, FIG. 6A illustrates a state where the infrared cut filter 3 is inserted into the optical path in the day mode, and FIG. 6C illustrates a state where movement of the filter holder 5 in a direction perpendicular to the optical axis (the +Z direction) is regulated. According to the present exemplary embodiment, in a case where the infrared cut filter 3 is in the state illustrated in FIG. 6A, it is expressed that the filter holder 5 is in a day mode setting position. FIG. 6B is an enlarged view of a portion VIb in FIG. 6A, and FIG. 6D is an enlarged view of a portion VId in FIG. 6C.

As illustrated in FIG. 6B, the filter holder 5 has a first protrusion portion 5*h* that protrudes upward in the direction perpendicular to the optical axis (the Z direction). The fixing frame 21 has a first regulating portion 21*f* that protrudes downward in the direction perpendicular to the optical axis (the Z direction). In other words, the first regulating portion 21*f* is provided on the fixing frame 21, which is the immovable member with respect to the filter holder 5. The first protrusion portion 5*h* faces the first regulating portion 21*f* with a predetermined distance therebetween. As illustrated in FIG. 6D, the first protrusion portion 5*h* abuts on the first regulating portion 21*f*, and thus the movement of the filter holder 5 in the direction perpendicular to the optical axis (the +Z direction) is regulated. In other words, the first regulating portion 21*f* is a regulating unit that regulates the movement of the filter holder 5 in the direction perpendicular to the optical axis 2. As illustrated in FIG. 6A, a second protrusion portion 5*m* that protrudes downward in the Z direction is provided on a left side of the lower side of the filter holder 5, and a second regulating portion 21*m* that protrudes upward in the Z direction is provide on the lower side of the fixing frame 21. The second protrusion portion 5*m* and the second regulating portion 21*m* are described below with reference to FIGS. 10A to 10D.

A case where the filter holder 5 is in a state in FIG. 6C where the movement in the direction perpendicular to the optical axis (the +Z direction) is regulated is, for example, a case where the imaging device 100 receives vibration or shock in a state in FIG. 6A and the filter holder 5 is moved in the direction perpendicular to the optical axis (the +Z direction).

If the imaging device 100 receives vibration or shock, the main teeth 22*c* of the rack 22 may get over the screw portion of the screw shaft portion 6*c*. Alternatively, the screw shaft portion 6*c* may rotate. If the main teeth 22*c* of the rack 22 get over the screw portion of the screw shaft portion 6*c*, or if the screw shaft portion 6*c* rotates, the filter holder 5 is moved in the direction perpendicular to the optical axis (the Z direction).

FIGS. 7A to 7C are perspective views illustrating a relationship between the filter holder 5 and the photointerrupter 7 of the filter switching structure 200. In FIG. 7A, illustration of the photointerrupter 7 is omitted. In FIG. 7B, the photointerrupter 7 is illustrated. FIG. 7C is an enlarged view in the vicinity of the photointerrupter 7 (an enlarged view of a portion VIIc in FIG. 7B).

In FIGS. 7A to 7C, the filter holder 5 has a first light-blocking portion 5*f* on a right side of the infrared cut filter 3, and a second light-blocking portion 5*g* on a right side of the dummy glass 4. The first light-blocking portion 5*f* is a plate portion that protrudes in the X direction. The first light-blocking portion 5*f* is separated from the second light-blocking portion 5*g* by a predetermined distance in the Z direction. The second light-blocking portion 5*g* is also a plate portion that protrudes in the X direction. A line connecting the first light-blocking portion 5*f* to the second light-blocking portion 5*g* is parallel to the first guide bar 24. The first light-blocking portion 5*f* and the second light-blocking portion 5*g* may each be referred to as a detected portion to be detected by the photointerrupter 7.

As described above, the light-emitting unit 7L and the light-receiving unit 7R of the photointerrupter 7 face each other, and there is a space (gap) between the light-emitting unit 7L and the light-receiving unit 7R. The first light-blocking portion 5*f* and the second light-blocking portion 5*g* can each enter the gap between the light-emitting unit 7L and the light-receiving unit 7R of the photointerrupter 7 and block light emitted from the light-emitting unit 7L. FIG. 7C illustrates a state where the first light-blocking portion 5*f* enters the gap between the light-emitting unit 7L and the light-receiving unit 7R of the photointerrupter 7.

The photointerrupter 7 detects transmission or blocking of the light from the light-emitting unit 7L to the light-receiving unit 7R and detects a position of the detected portion (the first light-blocking portion 5*f* or the second light-blocking portion 5*g*).

FIGS. 8A to 8F illustrate the filter switching structure 200 in the day mode viewed from the direction perpendicular to the optical axis 2 (the −Y direction). More specifically, FIG. 8A illustrates a day mode setting position state in which the infrared cut filter 3 is inserted into the optical path, and FIG. 8C illustrates an origin position setting state. FIG. 8B is an enlarged view of a portion VIIIb in FIG. 8A. FIG. 8B is an enlarged view in the vicinity of the photointerrupter 7. FIG. 8D is an enlarged view of a portion VIIId in FIG. 8C.

The photointerrupter 7 has a detection switching position 7*a*. In the states in FIG. 8A and FIG. 8B, the detection switching position 7*a* overlaps the first light-blocking portion 5*f*. In other words, the detection switching position 7*a* is blocked from light by the first light-blocking portion 5*f*. Thus, the photointerrupter 7 detects the light-blocking state. In a case where the filter holder 5 moves down from the position in FIG. 8A to the position in FIG. 8C, the photointerrupter 7 is switched from light-blocking state detection to light-transmitting state detection.

In the states in FIGS. 8C and 8D, the detection switching position 7*a* does not overlap the first light-blocking portion 5*f*. In other words, the detection switching position 7*a* is not blocked from light by the first light-blocking portion 5*f*, and the photointerrupter 7 detects a light-transmitting state.

According to the present exemplary embodiment, in a case where the filter holder 5 is in the position illustrated in FIG. 8C, it is expressed that the filter holder 5 is in a first origin position. If the stepping motor 6 is driven by a predetermined number of steps to move the filter holder 5 from the first origin position in a predetermined direction (upward), the filter holder 5 enters the day mode setting position state illustrated in FIG. 8A.

As described above, there is a possibility that the imaging device 100 receives vibration or shock, and the filter holder 5 is moved in the Z direction. For example, it is assumed that the filter holder 5 moves downward from the position illustrated in FIG. 8A to the position illustrated in FIG. 8E due to an impact while the stepping motor 6 is not driven. In this case, the photointerrupter 7 detects the light-transmitting state, but since the stepping motor 6 is not driven, the light-transmitting state is accidentally detected. In other words, it can be determined that the filter holder 5 is unexpectedly moved from the state illustrated in FIG. 8A, which is the day mode setting position state. FIG. 8F is an enlarged view of a portion VIIIf in FIG. 8E. If the imaging device 100 is brought into the state illustrated in FIG. 8E while being set in the day mode, the center of the first opening 5j of the filter holder 5 is displaced from an opening center (the intersection of the axis Y1 and the axis Z1 in FIG. 3B) of the fixing frame 21, and a part (lower part) of the infrared cut filter 3 is hidden by the fixing frame 21 (see FIG. 9C).

According to the present exemplary embodiment, in a case where the filter holder 5 moves upward from the position in FIG. 8E to the position in FIG. 8C, the photointerrupter 7 is switched from the light-transmitting state detection to the light-blocking state detection.

Figure 9B:
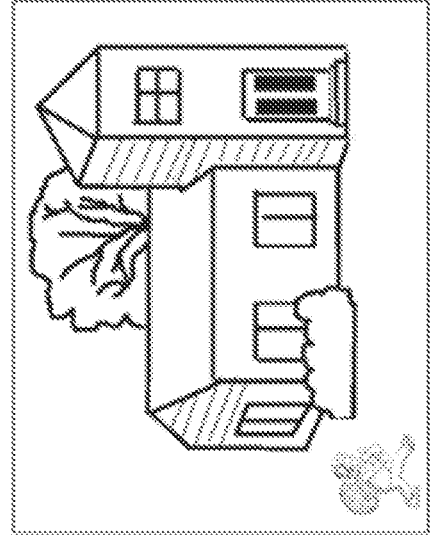
FIGS. 9A to 9D illustrate images captured in the day mode.
Figure 9D:
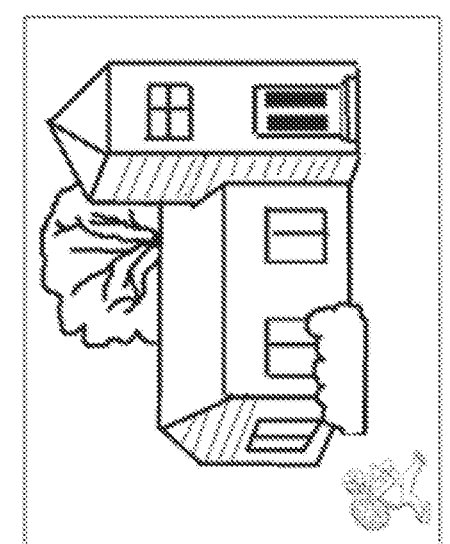
Figure 9A:
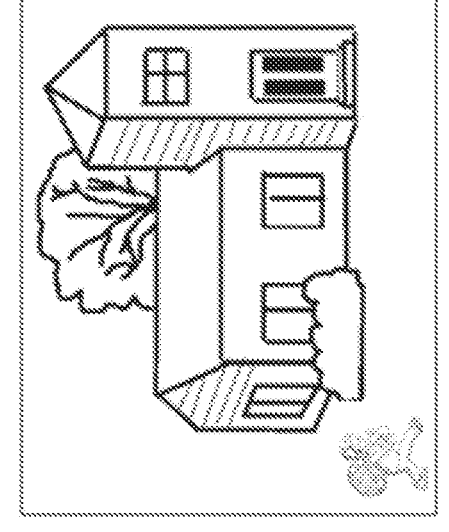
Figure 9C:
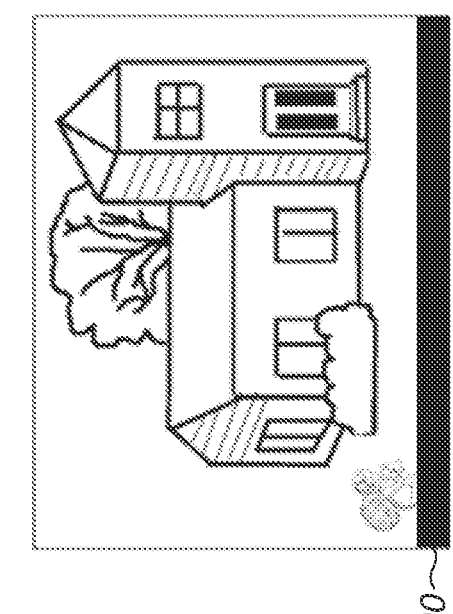

FIGS. 9A to 9D illustrate captured images for each position of the filter holder 5 in a case where the imaging device 100 is in the day mode. Specifically, FIG. 9A illustrates the captured image if the filter holder 5 is in the day mode setting position illustrated in FIG. 8A. FIG. 9B illustrates the captured image if the filter holder 5 is in the position illustrated in FIG. 8C. FIG. 9C illustrates the captured image if the filter holder 5 is in the position illustrated in FIG. 8E. FIG. 9D illustrates the captured image if the filter holder 5 is in a regulating position illustrated in FIG. 6D.

Only in FIG. 9C among FIGS. 9A to 9D, the captured image includes a shaded black portion 90. The black portion 90 in the captured image in FIG. 9C is generated because the first opening 5j of the filter holder 5 is displaced downward with respect to the imaging element 8 (with respect to the optical axis 2), and a part of an effective light beam of a subject image to be incident on the imaging element 8 is blocked by the filter holder 5. The effective light beam of the subject image to be incident on the imaging element 8 is a light beam from the subject that is incident on the effective pixel of the imaging element 8.

A reason why there is no black portion 90 in the captured images illustrated in FIGS. 9B and 9D is because although the filter holder 5 is displaced from the day mode setting position, the first opening 5j has an opening area in which the effective light beam incident on the imaging element 8 is not blocked by the filter holder 5 with a displacement amount of that position.

Figures 10A, 10B, 10C, 10D:
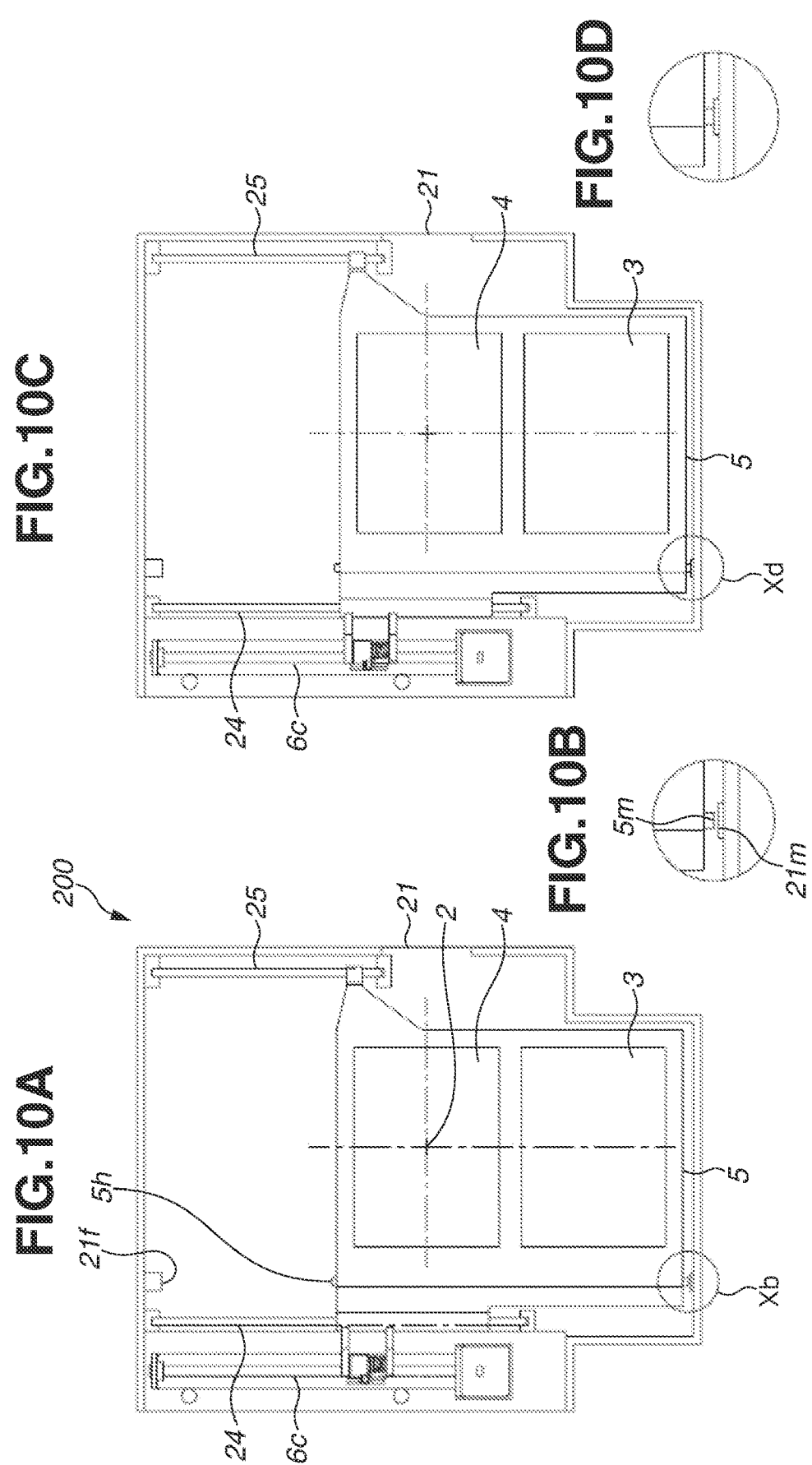
FIGS. 10A to 10D illustrate the filter switching structure in a night mode.

FIGS. 10A to 10D illustrate the filter switching structure 200 in the night mode viewed from the imaging lens 1 side. More specifically, FIG. 10A illustrates a state where the dummy glass 4 is inserted into the optical path in the night mode, and FIG. 10C illustrates a state where movement of the filter holder 5 in the direction perpendicular to the optical axis (the –Z direction) is regulated. According to the present exemplary embodiment, in a case where the dummy glass 4 is in the state illustrated in FIG. 10A, it is expressed that the filter holder 5 is in a night mode setting position. FIG. 10B is an enlarged view of a portion Xb in FIG. 10A, and FIG. 10D is an enlarged view of a portion Xd in FIG. 10C.

As illustrated in FIG. 10B, the filter holder 5 has the second protrusion portion 5m that protrudes downward in the direction perpendicular to the optical axis (the Z direction). The fixing frame 21 has the second regulating portion 21m that protrudes upward in the direction perpendicular to the optical axis (the Z direction). The second protrusion portion 5m faces the second regulating portion 21m with a predetermined distance therebetween. As illustrated in FIG. 10D, the second protrusion portion 5m abuts on the second regulating portion 21m, and thus the movement of the filter holder 5 in the direction perpendicular to the optical axis (the –Z direction) is regulated. In other words, the second regulating portion 21m is a regulating unit that regulates the movement of the filter holder 5 in the direction perpendicular to the optical axis 2.

FIGS. 11A to 11F illustrate the filter switching structure 200 in the night mode viewed from the direction perpendicular to the optical axis. More specifically, FIG. 11A illustrates a night mode setting position state in which the dummy glass 4 is inserted into the optical path, and FIG. 11C illustrates a second origin position setting state. FIG. 11B is an enlarged view of a portion XIb near the photointerrupter 7 in FIG. 11A, and FIG. 11D is an enlarged view of a portion XId in FIG. 11C.

As described with reference to FIGS. 8A to 8F, the photointerrupter 7 has the detection switching position 7a. In the states in FIGS. 11A and 11B, the detection switching position 7a overlaps the second light-blocking portion 5g. In other words, the detection switching position 7a is blocked from light by the second light-blocking portion 5g. Thus, the photointerrupter 7 detects the light-blocking state.

On the other hand, in the states in FIGS. 11C and 11D, the detection switching position 7a does not overlap the second light-blocking portion 5g. In other words, the detection switching position 7a is not blocked from light by the second light-blocking portion 5g, and the photointerrupter 7 detects the light-transmitting state. FIG. 11C illustrates a state where the filter holder 5 moves upward from the state illustrated in FIG. 11A.

According to the present exemplary embodiment, in a case where the filter holder 5 is in the position illustrated in FIG. 11C, it is expressed that the filter holder 5 is in a second origin position. If the stepping motor 6 is driven by the predetermined number of steps to move the filter holder 5 from the second origin position in a predetermined direction (downward), the filter holder 5 enters the night mode setting position state illustrated in FIG. 11A.

As described above, there is a possibility that the imaging device 100 receives vibration or shock, and the filter holder 5 is moved in the Z direction. For example, it is assumed that the filter holder 5 moves upward from the position illustrated in FIG. 11A to the position illustrated in FIG. 11E due to an impact while the stepping motor 6 is not driven. In this case, the photointerrupter 7 detects the light-transmitting state, but since the stepping motor 6 is not driven, the light-transmitting state is accidentally detected. In other words, it can be determined that the filter holder 5 is unexpectedly moved from the state illustrated in FIG. 11A, which is the night mode setting position state. FIG. 11F is an enlarged view of a portion XIf in FIG. 11E.

FIGS. 12A to 12D illustrate captured images for each position of the filter holder 5 in the night mode.

Figure 12B:
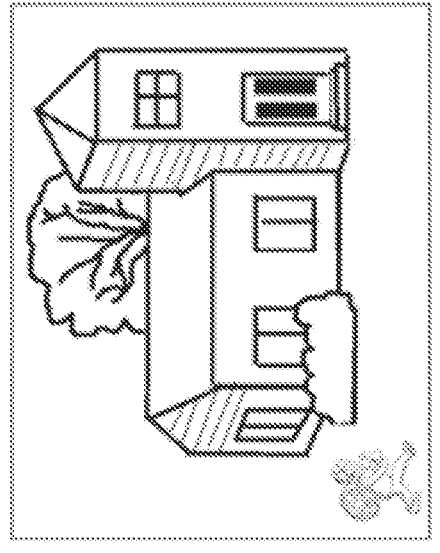
FIGS. 12A to 12D illustrate images captured in the night mode.
Figure 12D:
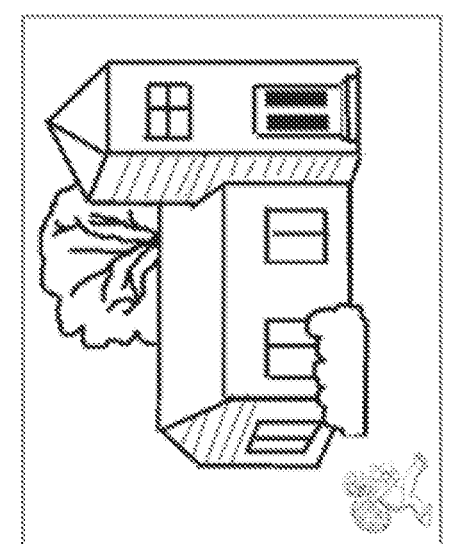
Figure 12A:
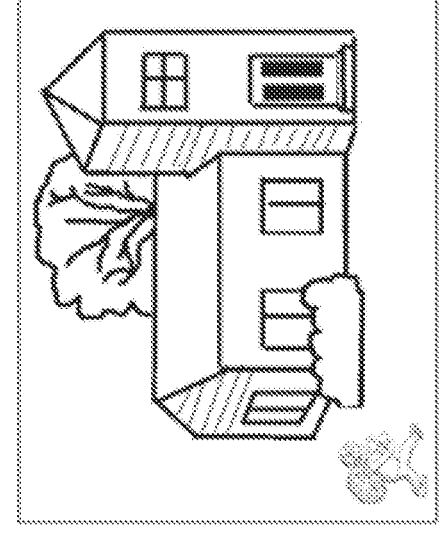
Figure 12C:
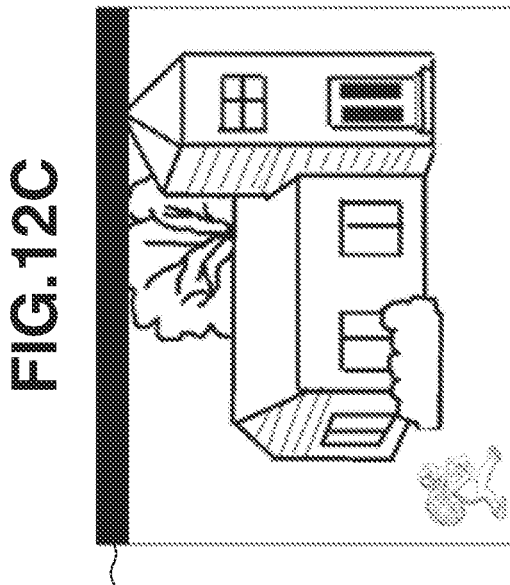

FIG. 12A illustrates the captured image if the filter holder 5 is in the night mode setting position illustrated in FIG. 11A. FIG. 12B illustrates the captured image if the filter holder 5 is in the position illustrated in FIG. 11C. FIG. 12C illustrates the captured image if the filter holder 5 is in the position illustrated in FIG. 11E. FIG. 12D illustrates the captured image if the filter holder 5 is in a second regulating position illustrated in FIG. 10D.

Only in FIG. 12C among FIGS. 12A to 12D, the captured image includes a shaded black portion 120. The black portion 120 in the captured image in FIG. 12C is generated because the second opening 5k of the filter holder 5 is displaced upward with respect to the imaging element 8 (with respect to the optical axis 2), and a part of the effective light beam of the subject image to be incident on the imaging element 8 is blocked by the filter holder 5.

A reason why there is no black portion 120 in the captured images illustrated in FIGS. 12B and 12D is because although the filter holder 5 is displaced from the night mode setting position, the second opening 5k has an opening area in which the effective light beam incident on the imaging element 8 is not blocked by the filter holder 5 with a displacement amount of that position.

Figure 13:
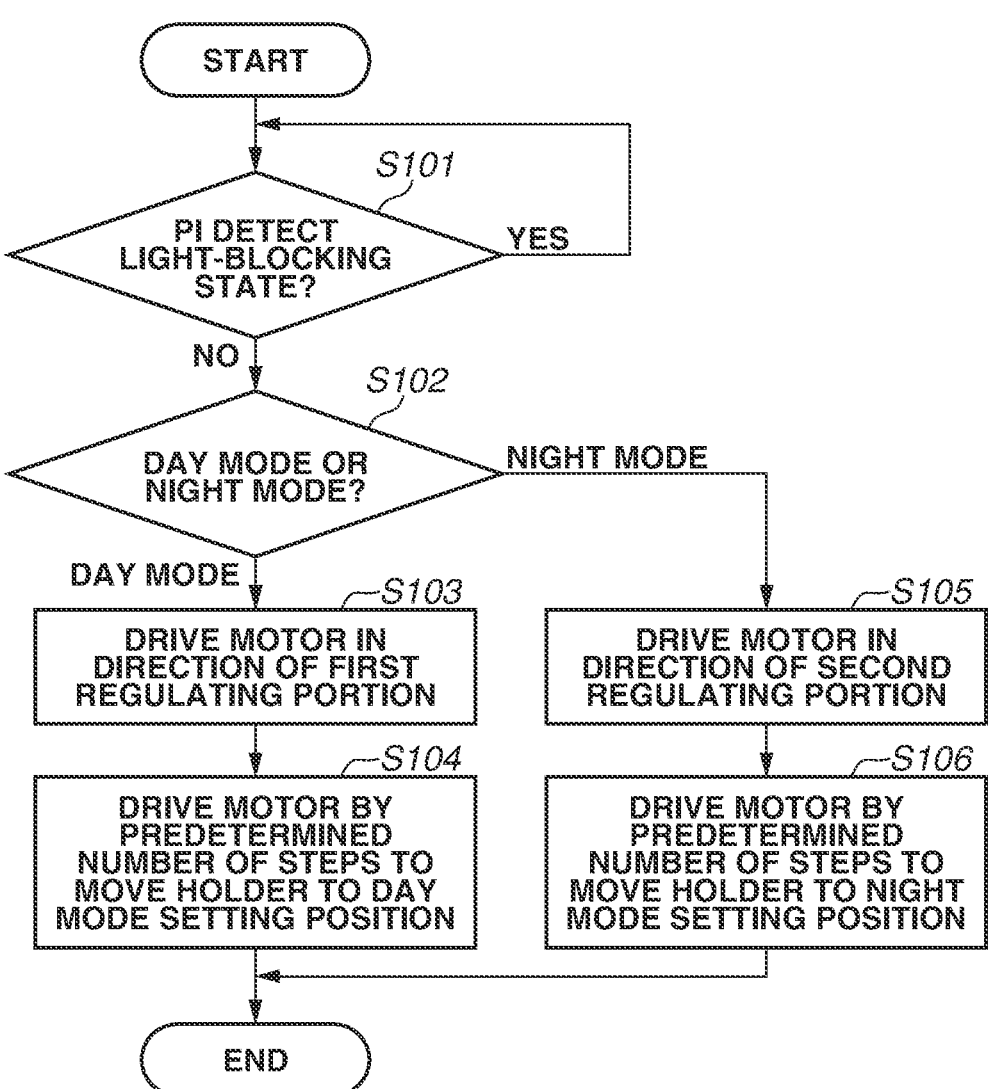
FIG. 13 is a flowchart illustrating control to return the filter holder to a setting position.

FIG. 13 is a flowchart illustrating control to return the filter holder 5 to the setting position (the day mode setting position or the night mode setting position) in a case where the filter holder 5 is unexpectedly moved. Processing in the flowchart in FIG. 13 is realized by the camera control unit 14 executing a program loaded in a RAM, which is not illustrated. The processing in the flowchart in FIG. 13 is started, for example, after setting of an initial position of the filter holder 5 (processing illustrated in a flowchart in FIG. 14) is completed.

In step S101, the camera control unit 14 determines whether the photointerrupter 7 detects the light-blocking state. In a case where it is determined that the photointerrupter 7 detects not the light-blocking state but the light-transmitting state (NO in step S101), the processing proceeds to step S102. In a case where it is determined that the photointerrupter 7 detects the light-blocking state (YES in step S101), the processing in step S101 is repeated (a detection result of the photointerrupter 7 is continuously determined).

In a case where the position of the filter holder 5 is set to either the day mode setting position (FIG. 6A) or the night mode setting position (FIG. 10A), it is in the light-blocking state (FIGS. 8B and 11B). Thus, if the filter holder 5 is in the setting position (the day mode setting position or the night mode setting position), the determination result in step S101 will be YES. If the filter holder 5 is displaced from the setting position, the determination result in step S101 will be NO. In other words, in step S101, it is determined whether the filter holder 5 is displaced (unexpectedly moved) from the setting position.

In step S102, the camera control unit 14 determines whether a current mode is set to the day mode or the night mode. If it is the day mode (DAY MODE in step S102), the processing proceeds to step S103. In a case where the processing proceeds to step S103, according to the present exemplary embodiment, the filter holder 5 is in the state illustrated in FIG. 8E. If it is the night mode (NIGHT MODE in step S102), the processing proceeds to step S105. In a case where the processing proceeds to step S105, according to the present exemplary embodiment, the filter holder 5 is in the state illustrated in FIG. 11E.

In step S103, the camera control unit 14 drives the stepping motor 6 to move the filter holder 5 upward from the state illustrated in FIG. 8E (to move the filter holder 5 in a direction in which it abuts on the first regulating portion 21f). This movement is performed until an output (detection result) of the photointerrupter 7 is switched from the light-transmitting state to the light-blocking state. In step S103, a movement direction in which the filter holder 5 moves to the position where the detection result of the photointerrupter 7 is switched is determined in the imaging mode of the imaging device 100. Subsequently, the processing proceeds to step S104.

The position where the output of the photointerrupter 7 is switched from the light-transmitting state (FIG. 8E) to the light-blocking state is the first origin position (FIG. 8C). In other words, the filter holder 5 is moved to the position illustrated in FIG. 8C by the processing in step S103.

In step S104, the camera control unit 14 drives the stepping motor 6 by the predetermined number of steps to move the filter holder 5 from the first origin position (FIG. 8C) to the day mode setting position (FIG. 8A), and terminates the processing in the present flowchart. The direction in which the filter holder 5 is moved in step S104 is the same as the direction in which the filter holder 5 is moved in step S103. In other words, the movement direction in which the filter holder 5 is moved to the position where the detection result of the photointerrupter 7 is switched in step S103 is the same as the direction in which the filter holder 5 is moved subsequently (in step S104) a predetermined distance.

In step S105, the camera control unit 14 drives the stepping motor 6 to move the filter holder 5 downward from the state illustrated in FIG. 11E (to move the filter holder 5 in a direction in which it abuts on the second regulating portion 21m). This movement is performed until the output (detection result) of the photointerrupter 7 is switched from the light-transmitting state to the light-blocking state. Subsequently, the processing proceeds to step S106.

The position where the output of the photointerrupter 7 is switched from the light-transmitting state (FIG. 11E) to the light-blocking state is the second origin position (FIG. 11C). In other words, the filter holder 5 is moved to the position illustrated in FIG. 11C by the processing in step S105.

In step S106, the camera control unit 14 drives the stepping motor 6 by the predetermined number of steps to move the filter holder 5 from the second origin position (FIG. 11C) to the night mode setting position (FIG. 11A), and terminates the processing in the present flowchart. The predetermined direction and the predetermined number of steps used in the processing in the flowchart in FIG. 13 are set in advance and stored in the memory 15.

The above-described control is performed, so that even if the filter holder 5 is displaced to a position where it affects a captured image, the filter holder 5 can be immediately returned to a position where it does not affect the captured image.

Figure 14:
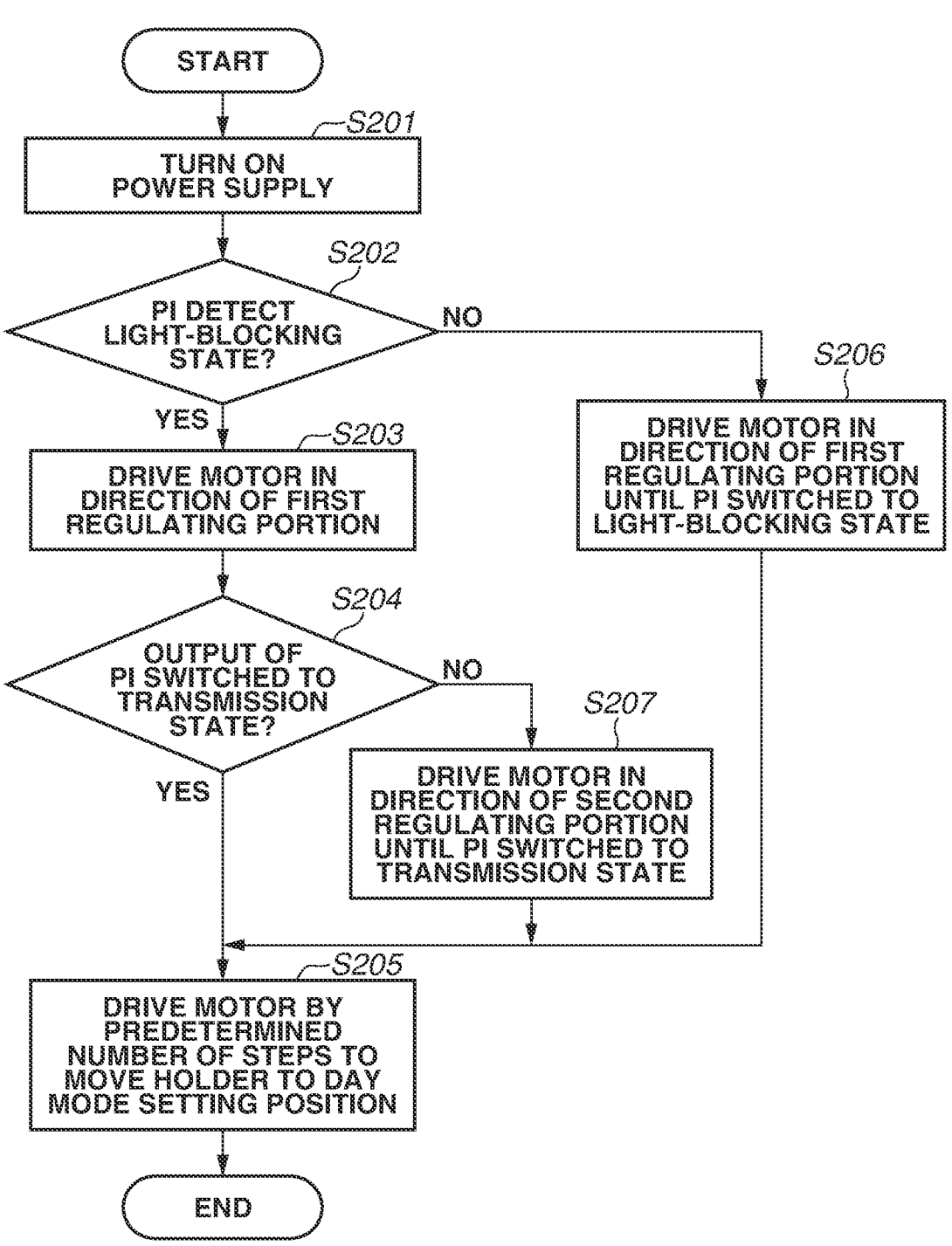
FIG. 14 is a flowchart illustrating control to set the filter holder to an initial position.

FIG. 14 is a flowchart illustrating control for initial position setting (to move the filter holder 5 to the initial position) in a case where a power supply of the imaging 100 is turned on. It is assumed that the initial position of the filter holder 5 is the day mode setting position (FIG. 8A). Processing in the present flowchart is realized by the camera control unit 14 executing a program loaded in a RAM, which is not illustrated.

According to the present exemplary embodiment, one photointerrupter 7 is provided on the fixing frame 21, and the filter holder 5, which can relatively move with respect to the fixing frame 21, is provided with two light-blocking portions (the first light-blocking portion 5f and the second light-blocking portion 5g). Thus, the filter holder 5 has two output switching positions with respect to the photointerrupter 7. FIG. 14 illustrates how the filter holder 5, which has two output switching positions, is set to the day mode setting position.

In step S201, if the power supply of the imaging device 100 is turned on, the processing proceeds to step S202.

In step S202, the camera control unit 14 determines whether the output (detection result) of the photointerrupter 7 is the light-blocking state or the light-transmitting state. If it is the light-blocking state (YES in step S202), the processing proceeds to step S203. The light-blocking state occurs in a case where light emission of the photointerrupter 7 is blocked by the first light-blocking portion 5f or the second light-blocking portion 5g. If the output of the photointerrupter 7 is the light-transmitting state (NO in step S202), the processing proceeds to step S206. The light-transmitting state occurs in a case where the photointerrupter 7 is located between the first light-blocking portion 5f and the second light-blocking portion 5g.

In step S203, the camera control unit 14 drives the stepping motor 6 by the predetermined number of steps to move the filter holder 5 a predetermined amount in a direction in which it abuts on the first regulating portion 21f.

In step S204, the camera control unit 14 determines whether the output of the photointerrupter 7 is switched from the light-blocking state to the light-transmitting state. If the determination result is YES (YES in step S204), the processing proceeds to step S205. The determination result becomes YES in a case where the light emission of the photointerrupter 7 is blocked by the second light-blocking portion 5g. If the determination result is NO (NO in step S204), the processing proceeds to step S207. The determination result becomes NO in a case where the light emission of the photointerrupter 7 is blocked by the first light-blocking portion 5f. In a case where light is blocked by the first light-blocking portion 5f, even if the filter holder 5 is moved, the filter holder 5 abuts on the first regulating portion 21f and its movement is regulated. Thus, the light remains blocked in that state. In other words, the camera control unit 14 can operate as a determination unit configured to determine whether the opening of the filter holder 5 or holding unit is within a predetermined range based on a detection result of the photointerrupter 7 or detection unit, to control the stepping motor 6 or moving unit based on a determination result of the determination unit.

In step S205, the camera control unit 14 drives the stepping motor 6 in the predetermined direction by the predetermined number of steps from the output switching position of the photointerrupter 7 detected in step S204 to place the filter holder 5 in the day mode setting position, and terminates the processing in the present flowchart. The predetermined direction and the predetermined number of steps are set in advance and stored in the memory 15.

In step S206, the camera control unit 14 drives the stepping motor 6 to move the filter holder 5 in a direction in which it abuts on the first regulating portion 21f. The movement is performed until the output of the photointerrupter 7 is switched from the light-transmitting state to the light-blocking state. Subsequently, the processing proceeds to step S205.

In step S207, the camera control unit 14 drives the stepping motor 6 to move the filter holder 5 in a direction in which it abuts on the second regulating portion 21m. The movement in step S207 is in a direction opposite to the movement direction in step S203. The movement in step S207 is performed until the output of the photointerrupter 7 is switched from the light-blocking state to the light-transmitting state. Subsequently, the processing proceeds to step S205.

In a case where the filter holder 5 is urged against (is brought into contact with) the first regulating portion 21f by driving the stepping motor 6, the rack 22 is urged toward a direction of the hole portion 5c as can be seen from FIGS. 4A and 4B. In this state, there is no possibility that the rack 22 will come off from the filter holder 5. Conversely, in a case where the filter holder 5 is urged against the second regulating portion 21m by driving the stepping motor 6, the rack 22 is urged toward a direction of the groove portion 5d as can be seen from FIGS. 4A and 4B. In this case, the rack 22 is urged in a direction in which the rack spring 23 is compressed. In other words, the rack spring 23 can operate as an urging unit to urge the rack 22 against the filter holder 5 from one side in the movement direction of the filter holder 5. If the rack spring 23 is compressed, there is a possibility that the conical shaft portion 22a of the rack 22 comes off from the hole portion 5c of the filter holder 5, and the rack 22 comes off from the filter holder 5. A predetermined direction to which the filter holder 5 is moved at a time of turning on the power supply of the imaging device is a direction in which the rack spring 23 urges the rack 22.

In consideration of this possibility, the control illustrated in FIG. 14 is performed so that the filter holder 5 is not urged against the second regulating portion 21m due to driving of the stepping motor 6. Thus, according to the present exemplary embodiment, there is no possibility that the rack 22 will come off from the filter holder 5. By following the processing in the flowchart in FIG. 14, the filter holder 5 can be moved to the initial position (can be set to the initial position) without the rack 22 coming off from the filter holder 5 in an initial position setting operation at the time of turning on the power supply of the imaging device 100.

The imaging device 100 according to the present exemplary embodiment includes a mechanism (the filter switching structure 200) for inserting and removing the infrared cut filter 3 and the dummy glass 4 into and from the optical path between the imaging lens 1 and the imaging element 8. The mechanism can prevent the filter holder 5 holding the optical filters (the infrared cut filter 3 and the dummy glass 4) from unexpectedly remaining in the optical path and continuously appearing in a captured image.

The filter holder 5 holding the optical filters (the infrared cut filter 3 and the dummy glass 4) holds the optical filters in the openings 5j and 5k, but in a case where the filter holder 5 is displaced due to vibration or shock, a part of the filter holder 5 may block a part of the light beam incident on the imaging element 8. If a part of the light beam incident on the imaging element 8 is blocked, the shadow of the filter holder 5 appears in a captured image. According to the present exemplary embodiment, even if the filter holder 5 is unexpectedly moved, the shadow of the filter holder 5 will not appear in a captured image.

The imaging device 100 according to the present exemplary embodiment can prevent the filter holder 5 from continuously appearing in a captured image even if positions of the optical filters (the infrared cut filter 3 and the dummy glass 4) are moved from the setting state due to shock or vibration, without increasing the number of components or adding an impact sensor.

According to the above-described exemplary embodiments, the optical filters to be inserted into and removed from the optical path are the infrared cut filter 3 and the dummy glass 4, but the present disclosure is not limited to the above-described exemplary embodiments. For example, the present disclosure can also be applied to the imaging device 100 that can support various modes by alternately inserting three or more filters with different properties into the optical path. In this way, the imaging device 100 can support various modes by switching optical filters by inserting and removing a plurality of types of optical filters into and from the optical path and can perform imaging by switching modes according to an application.

Further, according to the above-described exemplary embodiments, the filter holder 5 can move in the vertical direction (the Z direction), but the present disclosure can be applied to the imaging device 100 even if the filter holder 5 can move in a direction other than the vertical direction (for example, the horizontal direction (the Y direction)).

The present disclosure can also be realized by executing the following processing. More specifically, a program for realizing the processing and control described in the above-described exemplary embodiments (for example, the control in FIGS. 13 and 14) is supplied to a system or an apparatus via a network or a storage medium and one or more processors in a computer of the system or the apparatus read and execute the program. Further, the present disclosure can also be realized by a circuit (for example, an application specific integrated circuit (ASIC)) that realizes one or more functions.

The above-described exemplary embodiments of the present disclosure are merely examples to implement the present disclosure, so that the examples should not be construed restrictively limiting the technical scope of the present disclosure. In other words, the present disclosure can be implemented in various forms without departing from its technical idea or main features.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors, circuitry, or combinations thereof (e.g., central processing unit (CPU), micro processing unit (MPU), or the like), and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2023-065923, filed Apr. 13, 2023, which is hereby incorporated by reference herein in its entirety.

What is claimed is:

1. An imaging device comprising:
an imaging lens;
an imaging element;
an optical element;
a holder that is arranged between the imaging lens and the imaging element in an optical axis direction of the imaging lens and configured to include an opening on which the optical element is mounted and to hold the optical element;
a driver that moves the holder in a direction perpendicular to an optical axis of the imaging lens;
a regulating portion that regulates movement of the holder in the direction perpendicular to the optical axis;
a detector that detects a position of the holder, the detector including a light emitter and a light receiver holding unit;
a hardware processor; and
a memory for storing instructions to be executed by the hardware processor,
wherein, when the instructions stored in the memory are executed by the hardware processor, the imaging device functions as:
a determination unit configured to determine whether the opening of the holder is within a predetermined range based on a detection result of the detector; and
a control unit configured to control the driver based on a determination result of the determination unit,
wherein the predetermined range is defined by a position where movement of the holder is regulated by the regulating portion and a position where the detection result of the detector is switched, and
wherein, in a case where the opening of the holder is within the predetermined range, the opening does not block a light beam incident on an effective pixel of the imaging element.

2. The imaging device according to claim 1, wherein the driver is a motor that includes a lead screw, the holder is provided with a rack member having an engagement portion that engages with the lead screw, and the driver moves the holder via the rack member.

3. The imaging device according to claim 1, wherein, in a case where the determination unit determines that the opening is not within the predetermined range, the control unit moves the holder to a position where the detection result of the detector is switched and then controls the driver to move the holder a predetermined distance.

4. The imaging device according to claim 3, wherein a movement direction in a case where the holder is moved to the position where the detection result of the detector is switched is the same as a direction in which the holder is subsequently moved the predetermined distance.

5. The imaging device according to claim 4, wherein the movement direction in a case where the holder is moved to the position where the detection result of the detector is switched is determined by an imaging mode of the imaging device.

6. The imaging device according to claim 2, wherein the imaging device includes two optical elements, the holder includes two openings, the two optical elements are respectively mounted on the two openings, the regulating portion is mounted on each of both ends of a fixing frame in the direction perpendicular to the optical axis, and there are two predetermined ranges corresponding to the two openings.

7. The imaging device according to claim 6, wherein the driver moves the holder unit in a predetermined direction by a predetermined amount at a time of turning on a power supply to the imaging device to set the position where the detection result of the detector is switched to a position defining one predetermined range in the two predetermined ranges, and, in a case where the detection result of the detector is not switched, the driver moves the holder in an opposite direction to set the position where the detection result of the detector is switched to a position defining the other predetermined range in the two predetermined ranges.

8. The imaging device according to claim 7, further comprising an urging member configured to urge the rack member against the holder from one side in a movement direction of the holder, wherein a predetermined direction in which the holder is moved at the time of turning on the power supply of the imaging device is a direction in which the urging member urges the rack member.

9. The imaging device according to claim 1, wherein the holder includes a detected portion to be detected by the detector.

10. The imaging device according to claim 1, wherein the regulating portion is provided on an immovable member with respect to the holder.

11. The imaging device according to claim 10, wherein the detector-detection unit is provided on the immovable member.

12. A method for controlling an imaging device comprising:

an imaging lens;

an imaging element;

an optical element;

a holder that is arranged between the imaging lens and the imaging element in an optical axis direction of the imaging lens and configured to include an opening on which the optical element is mounted and to hold the optical element;

a driver that moves the holder in a direction perpendicular to an optical axis of the imaging lens;

a regulating portion that regulates movement of the holder in the direction perpendicular to the optical axis; and a detector that detects a position of the holder, the detector includes a light emitter and a light receiver, the method comprising:

determining whether the opening of the holder is within a predetermined range based on a detection result of the detector; and controlling the driver based on a determination result of the determining, wherein the predetermined range is defined by a position where movement of the holder is regulated by the regulating portion and a position where the detection result of the detector is switched, and wherein, in a case where the opening of the holder is within the predetermined range, the opening does not block a light beam incident on an effective pixel of the imaging element.

13. A non-transitory computer-readable storage medium configured to store a computer program for causing an imaging device comprising an imaging lens, an imaging element, an optical element, a holder that is arranged between the imaging lens and the imaging element in an optical axis direction of the imaging lens and configured to include an opening on which the optical element is mounted and to hold the optical element, a driver that moves the holder in a direction perpendicular to an optical axis of the imaging lens, a regulating portion that regulates movement of the holder in the direction perpendicular to the optical axis, and a detector that detects a position of the holder, the detector includes a light emitter and a light receiver, to execute the following steps:

determining whether the opening of the holder is within a predetermined range based on a detection result of the detector; and controlling the driver based on a determination result of the determining, wherein the predetermined range is defined by a position where movement of the holder is regulated by the regulating portion and a position where the detection result of the detector is switched, and wherein, in a case where the opening of the holder is within the predetermined range, the opening does not block a light beam incident on an effective pixel of the imaging element.

* * * * *